Patented Aug. 6, 1929.

1,723,199

UNITED STATES PATENT OFFICE.

WILHELM NEELMEIER, OF LEVERKUSEN, AND THEODOR NOCKEN, OF WIESDORF, GERMANY, ASSIGNORS TO GENERAL ANILINE WORKS, INC., OF NEW YORK, N. Y., A CORPORATION OF DELAWARE.

DYESTUFF OF THE NAPHTHOPHENAZINE SERIES OBTAINED FROM 3-ARYLAMINO-1-8-NAPHTHSULTAM COMPOUNDS.

No Drawing. Application filed July 21, 1926, Serial No. 124,090, and in Germany July 28, 1925.

Our invention consists in the production of naphthophenazine dyestuffs of the safranine type which are derived from 3-arylamino-1-8-naphthsultam compounds and in processes of making the same.

The production of safranine type dyestuffs containing the naphthophenazine nucleus

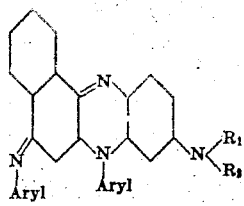

wherein $R_1$ and $R_2$ stand for hydrogen alkyl or aryl has been variously described. The reactions leading to the dyestuffs containing this nucleus consist mainly in condensing 1-3-di-arylamino-naphthalene compounds with p-nitroso-aminobenzene compounds, or joint oxidation of 1-3-di-arylamino-naphthalene compounds with p-diaminobenzene compounds.

Our invention consists in applying these reactions leading to the formation of the naphthophenazine nucleus to 3-arylamino-1-8-naphthsultam compounds. Condensation of these 3-arylamino-1-8-naphthsultams with p-nitroso-aminobenzene compounds or by oxidizing together p-diamines with the naphthsultam leads to the formation of very valuable novel dyestuffs containing chemically most likely the following nucleus

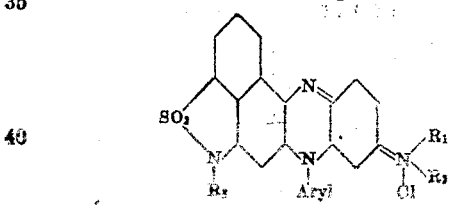

wherein $R_1$ and $R_2$ stand for hydrogen, alkyl, aryl or aralkyl, $R_3$ for hydrogen or alkyl which we call the naphthsultam-phenazine nucleus.

The 3-arylamino-1-8-naphthsultam compounds useful in our novel process are described in our co-pending application Serial No. 124,091, filed July 21, 1926. They are obtained by condensing 1-8-naphthsultam-3-sulfonic acid compounds with arylamines.

Amongst the arylamino-naphthsultam compounds we prefer to use the 3-arylamino-1-8-naphthsultam-6-sulfonic acids for the production of our novel dyestuffs. Also 3-arylamino-1-8-naphthsultam-6-sulfonic acids in which the naphthsultam nitrogen is substituted by an alkyl group have been found to yield valuable dyes.

Our novel naphthsultam-phenazine dyestuffs are chemically characterized by containing the naphthsultam-phenazine nucleus

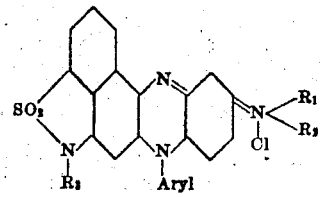

wherein $R_1$ and $R_2$ stand for hydrogen, alkyl, aryl or aralkyl, $R_3$ for hydrogen or alkyl.

They are in the dry state or in form of their hydrochlorides dark colored powders with metallic lustre, soluble in water and concentrated sulfuric acid with intense colors. Reducing agents react with them with formation of colorless leuco compounds from which oxidation regenerates the original dyestuffs. They dye wool from acid baths exceedingly level and clear red to violet shades.

The following examples will further illustrate our invention, the parts being by weight, but it is understood that our invention is not limited to the particular materials or reacting conditions mentioned therein.

*Example 1.*—276 parts 3-phenylamino-1-8-naphthsultam-6-sulfonic acid are dissolved in alcohol and 280 parts p-nitroso-dimethylaniline hydrochloride added. This solution is heated for a short time on the water bath whereby the p-nitrosodimethylaniline partly reacts as oxidizing agent according to the following equation:

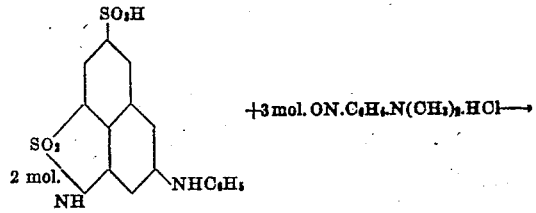

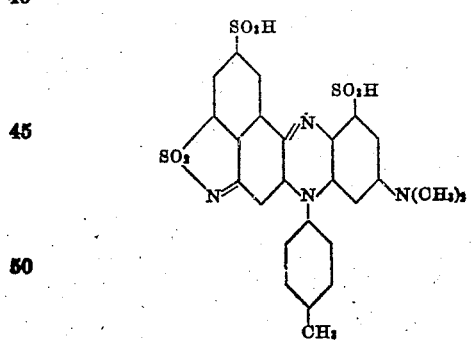

and then allowed to cool. The dyestuff crystallizes; it is filtered off and washed with alcohol. It is in the dry state a dark crystalline powder with a cuprous lustre, soluble in water with a reddish-violet color and dyes wool from an acid bath beautiful, level, reddish-violet shades.

*Example 2.*—390 parts 3-(4'-tolylamino)-1-8-naphthsultam-6-sulfonic acid are dissolved in 3000 parts 50% alcohol, neutralized and a solution of 216 parts 4-amino-dimethylaniline-3-sulfonic acid in 2000 parts 50% alcohol, neutralized with 53 parts soda ash added. 50 parts of a cuprammonium solution obtained from 50 parts blue vitriol are then added, the reaction mass heated to about 50° C. and air bubbled through. The naphthophenazine dye separates and is filtered off. It can be recrystallized from hot water. It has most probably the formula:

It is a dark crystalline powder with a cuprous lustre, soluble in water with a reddish-violet color and dyes wool from an acid bath violet, very level shades.

*Example 3.*—The dyestuff obtained from 3-phenylamino-1-8-naphthsultam-6-sulfonic acid and p-phenylenediamine-sulfonic acid, having most probably the formula

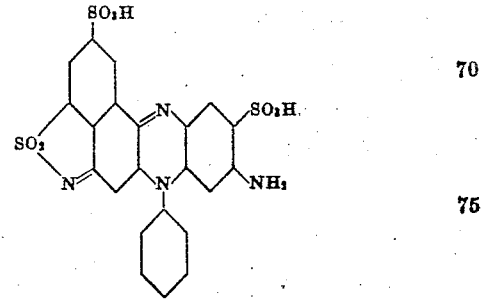

is a crystalline powder with a bronze-like lustre, soluble in water with a red color and in concentrated sulfuric acid with a brownish-yellow color. It dyes wool from an acid bath level, very clear red shades.

*Example 4.*—The dyestuff obtained from 3-phenylamino-8-N-methyl-1-8-naphthsultam-6-sulfonic acid and 4-amino-dimethyl-aniline-3-sulfonic acid is in form of its hydrochloride, having most probably the formula:

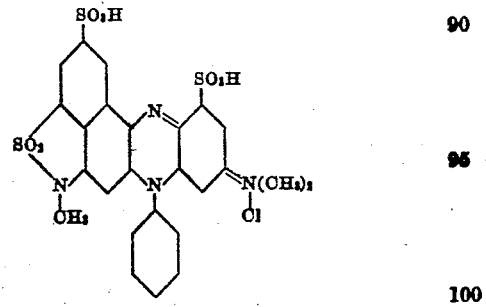

a violet powder with bronze-like lustre, soluble in water with a violet color, in concentrated sulfuric acid with a green color. It dyes wool from an acid bath brilliant violet, level shades.

We claim:—

1. As new products naphthsultam-phenazine dyestuffs corresponding to the formula:

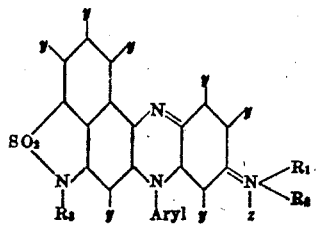

wherein $R_1$ and $R_2$ stand for any of the group, hydrogen, alkyl, aryl and aralkyl, $R_3$ stands for hydrogen or alkyl, $z$ designates an acid radicle and $y$ stands for hydrogen or a monovalent substituent, which are dark crystalline powders with metallic lustre, soluble in concentrated sulfuric acid and in water with intense colors, and dye wool from an acid bath red to violet level shades.

2. As new products naphthsultam-phenazine dyestuffs corresponding to the formula:

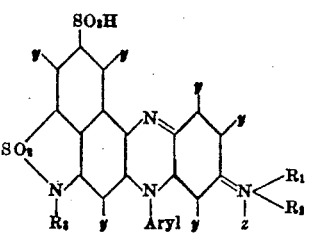

wherein $R_1$ and $R_2$ stand for any of the group, hydrogen, alkyl, aryl and aralkyl, $R_3$ stands for hydrogen or alkyl, $z$ designates an acid radicle and $y$ stands for hydrogen or a monovalent substituent, which are dark crystalline powders with metallic lustre soluble in concentrated sulfuric acid and in water with intense colors, and dye wool from an acid bath red to violet level shades.

3. As new products naphthsultam-phenazine dyestuffs corresponding to the formula:

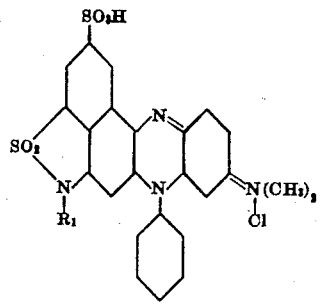

wherein $R_1$ stands for hydrogen or alkyl, which are dark crystalline powders with metallic lustre soluble in concentrated sulfuric acid and in water with intense colors, and dye wool from an acid bath red to violet level shades.

4. As a new product a naphthsultam-phenazine dyestuff corresponding to the formula:

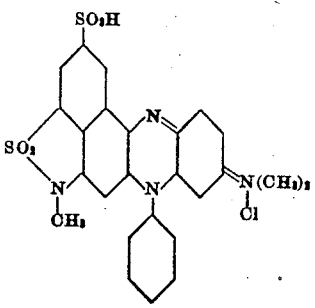

which is a violet powder with bronze-like lustre soluble in water with a violet color and in concentrated sulfuric acid with a green color, dyeing wool from an acid bath brilliant violet level shades.

In testimony whereof we affix our signatures.

WILHELM NEELMEIER.
THEODOR NOCKEN.

---

Certificate of Correction.

Patent No. 1,723,199.                    Granted August 6, 1929, to

WILHELM NEELMEIER ET AL.

It is hereby certified that error appears in the printed specification of the above numbered patent requiring correction as follows: Page 1, lines 65 to 70, strike out the formula and insert instead

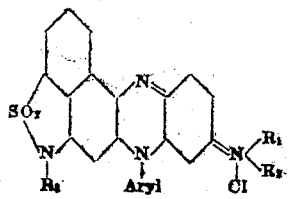

and that the said Letters Patent should be read with this correction therein that the same may conform to the record of the case in the Patent Office.

Signed and sealed this 8th day of October, A. D. 1929.

[SEAL.]

M. J. MOORE,
Acting Commissioner of Patents.